United States Patent
Willis

(10) Patent No.: US 7,949,588 B2
(45) Date of Patent: May 24, 2011

(54) MARKETING AND DELIVERING FINANCIAL COACHING SERVICES

(76) Inventor: Ethan Willis, Provo, UT (US)

(*) Notice: Subject to any disclaimer, the term of this patent is extended or adjusted under 35 U.S.C. 154(b) by 286 days.

(21) Appl. No.: 12/394,323

(22) Filed: Feb. 27, 2009

(65) Prior Publication Data

US 2009/0222327 A1 Sep. 3, 2009

Related U.S. Application Data

(60) Provisional application No. 61/032,757, filed on Feb. 29, 2008.

(51) Int. Cl.
*G06Q 40/00* (2006.01)
(52) U.S. Cl. .............................. 705/35; 705/7; 705/10
(58) Field of Classification Search ................ 705/35, 705/10, 7
See application file for complete search history.

(56) References Cited

U.S. PATENT DOCUMENTS

| | | | | |
|---|---|---|---|---|
| 5,915,246 A * | 6/1999 | Patterson et al. | ............... | 705/43 |
| 7,783,545 B2 * | 8/2010 | Sloan et al. | ............... | 705/36 R |
| 7,809,601 B2 * | 10/2010 | Shaya et al. | ............... | 705/10 |
| 2002/0046096 A1 * | 4/2002 | Srinivasan et al. | ............... | 705/14 |
| 2002/0055906 A1 * | 5/2002 | Katz et al. | ............... | 705/39 |
| 2002/0161664 A1 * | 10/2002 | Shaya et al. | ............... | 705/26 |
| 2004/0039639 A1 * | 2/2004 | Walker et al. | ............... | 705/14 |
| 2004/0255008 A1 * | 12/2004 | Olsen et al. | ............... | 709/220 |
| 2005/0159992 A1 * | 7/2005 | Lawrence et al. | ............... | 705/10 |
| 2006/0026048 A1 * | 2/2006 | Kolawa et al. | ............... | 705/7 |
| 2007/0219848 A1 * | 9/2007 | Hubsher | ............... | 705/10 |
| 2007/0239517 A1 * | 10/2007 | Chung et al. | ............... | 705/10 |
| 2007/0244750 A1 * | 10/2007 | Grannan et al. | ............... | 705/14 |
| 2007/0255691 A1 * | 11/2007 | Snyder | ............... | 707/3 |
| 2008/0046547 A1 * | 2/2008 | Olsen et al. | ............... | 709/220 |
| 2008/0086402 A1 * | 4/2008 | Patel et al. | ............... | 705/35 |
| 2008/0091530 A1 * | 4/2008 | Egnatios et al. | ............... | 705/14 |
| 2008/0201731 A1 * | 8/2008 | Howcroft | ............... | 725/13 |
| 2009/0132345 A1 * | 5/2009 | Meyssami et al. | ............... | 705/10 |
| 2009/0222327 A1 * | 9/2009 | Willis | ............... | 705/10 |
| 2009/0234712 A1 * | 9/2009 | Kolawa et al. | ............... | 705/10 |
| 2010/0004981 A1 * | 1/2010 | Katz et al. | ............... | 705/11 |

* cited by examiner

*Primary Examiner* — Narayanswamy Subramanian
(74) *Attorney, Agent, or Firm* — Madson IP, P.C.

(57) ABSTRACT

Marketing and delivering financial coaching services involves sponsoring a website pertaining to financial coaching services, engaging an electronic communications media partner to direct potential customers to the website, and calculating a behavior-based quality rating reflecting the business opportunity value of the potential customer. When the quality rating exceeds a predetermined threshold, the potential customer is associated to an assigned sales agent who determines an interest rating reflecting the importance of the financial coaching services to the potential customer. When the interest rating exceeds a predetermined threshold, the potential customer is associated to an assigned enroller who determines a readiness rating reflecting the willingness of the potential customer to purchase financial coaching services. When the readiness rating for the potential customer exceeds a predetermined rating, the potential customer is enrolled for financial coaching services, oriented by telephone, and receives an ordered sequence of one-on-one financial coaching sessions and financial coaching resources.

3 Claims, 7 Drawing Sheets

MARKETING AND DELIVERING FINANCIAL COACHING SERVICES

CROSS-REFERENCED RELATED APPLICATION

This patent application is a continuation-in-part of and claims the benefit of U.S. Provisional Patent Application Ser. No. 61/032,757 that was filed on Feb. 29, 2008, for an invention titled FINANCIAL COACHING PROCESS UTILIZING ELECTRONIC MEDIA and is incorporated into this application by this reference.

BACKGROUND OF THE INVENTION

1. Field of the Invention

The present invention relates to methods of marketing financial services. More specifically, the present invention relates to methods of marketing, generating business leads, closing sales, and delivering financial coaching services utilizing electronic communications media.

2. Background Art

Many individuals and entities offer financial coaching information to existing or acquired clients by telephone or in face-to-face encounters. During such encounters, the client communicates with a financial advisor to discuss relevant financial issues therewith. The client is informed, among other matters, as to the status of its accounts, and the client may be given notice by the financial advisor of financial coaching services that are available for purchase. These financial coaching services may have been available for sale previously, or the financial coaching services may have been created recently in the interest of improving the effectiveness of the financial decisions and transactions of clients.

There are, however, limitations to using the telephone or face-to-face encounters to accomplish the marketing financial coaching services.

Every buyer lead for financial coaching services does not represent a truly promising potential customer. The majority of buyer leads do not actually turn into revenue-generating customers. Therefore, using the telephone or face-to-face encounters to generate buyer leads is inefficient. Effective buyer lead generation over the telephone or in a face-to-face encounter engages trained personnel in a one-on-one communication encounter. Communications about financial matters are often complex and time consuming. Buyer lead generation conducted by telephone or in a face-to-face encounter is additionally inefficient, and as buyer leads end up being allocated among sales personnel and financial coaches in a random fashion, for example on the basis of chance timing only. The most promising buyer leads often fail to receive the attention of the most capable sales personnel and financial coaches. Also, complex financial information exchanged by telephone is limited in its effectiveness, because buyer leads and even existing clients are not able to view images corresponding to the information that is being discussed simultaneously with the verbal exchange.

Accordingly, a need exists for improved methods of marketing, generating buyer leads, closing sales, and delivering financial coaching services that do so with thoroughness, efficiency, and economy.

BRIEF SUMMARY OF THE INVENTION

According to teachings of the present invention a method for marketing financial coaching services involves sponsoring a website pertaining to the financial coaching services. Traffic to the website includes potential customers for the financial coaching services. A potential customer is advanced within the website based on data elicited from the potential customer at the website. A quality rating reflecting the business opportunity value of the potential customer is calculated based on the behavior of the potential customer at the website. In calculating a quality rating, consideration is taken of purchases made by the potential customer during the advancement of the potential customer within the website. A telephone conference is initiated by marketing personnel, and the readiness of the potential customer to purchase financial coaching services is evaluated. The potential customer is enrolled as a buyer of financial coaching services when the potential customer is evaluated, in the telephone conference, as being ready to purchase financial coaching services. Ultimately, one-on-one financial coaching is conducted with the buyer of the financial coaching services.

Evaluating the readiness of the potential customer involves assessing the importance of financial coaching services to the potential customer, and assessing the willingness of the potential customer to purchase financial coaching services.

The assessment of the importance of the financial coaching services to the potential customer occurs when the quality rating for the potential customer exceeds a predetermined threshold quality rating. The step of doing so includes associating the potential customer to an assigned sales agent on the basis of the quality rating determined for the potential customer, initiating a telephone conference by the assigned sales agent with the potential customer, and based on the behavior of the potential customer during the telephone conference determining an interest rating for the potential customer that reflects the importance of the financial coaching services to the potential customer. When the interest rating determined for the potential customer fails to exceed a predetermined threshold interest rating, data about the potential customer is added to a remarketing pool.

The assessment of the willingness of the potential customer to purchase financial coaching services occurs when the interest rating determined for the potential customer exceeds a predetermined threshold interest rating. That step involves associating the potential customer to an assigned enroller on the basis of the interest rating determined for the potential customer, initiating a telephone conference by the assigned enroller with the potential customer; and based on the behavior of the potential customer during the telephone conference determining a readiness rating for the potential customer reflecting the willingness of the potential customer to purchase financial coaching services. When the readiness rating determined for the potential customer fails to exceed a predetermined readiness rating, data about the potential customer is added to a remarketing pool.

In the inventive methodology, the step of advancing a potential customer within the website involves obtaining initial data from the potential customer at a landing page of the website, forwarding the potential customer to a follow-up location within the website based on the initial data; and obtaining further data from the potential customer at the follow-up location. The follow-up location is chosen from among a group of follow-up locations that includes a supplemental landing page, a chat window, a bump offer screen, and a customer consultation page.

According to one aspect of the present invention, an electronic communications media partner is engaged to direct potential customers for the financial coaching services to the website of the provider of financial coaching services. Then correspondingly, the sponsor of the website remits to the media partner a referral fee calibrated to the quality rating calculated for each potential customer.

In yet another aspect of the present invention, a method is provided for delivering financial coaching services that includes enrolling a potential customer as a buyer of the financial coaching services using electronic communication media, orienting the customer by telephone to the financial coaching services, conducting the buyer through an ordered sequence of one-on-one financial coaching sessions by way of electronic communication media, and requiring the completion by the customer of assignments between consecutive pairs of the financial coaching sessions.

By way of electronic communication media, the buyer may be supplied with financial coaching resources related to selected of the financial coaching sessions. The buyer is afforded access, by way of electronic communication media, to advanced financial conferences once the buyer has completed the sequence of financial coaching sessions. After completing the sequence of financial coaching sessions, the interest of the buyer is evaluated in purchasing supplemental financial coaching services.

In accord with yet an additional aspect of the teachings of the present invention, a method for marketing and delivering financial coaching services includes sponsoring a website pertaining to the financial coaching services, engaging an electronic communications media partner to direct to the website potential customers for the financial coaching service, and calculating a quality rating reflecting the business opportunity value of the potential customer based on the behavior of the potential customer at the website.

Initial data is obtained from a potential customer at the landing page of the website. The potential customer is forwarded to a follow-up location within the website based on the initial data, the follow-up location being chosen from among the group of follow-up locations including a supplemental landing page, a chat window, a bump offer screen, and a customer consultation page. Further data is obtained from the potential customer at the follow-up location.

The potential customer is associated to an assigned sales agent when the quality rating exceeds a predetermined threshold quality rating, and a telephone conference is initiated by the assigned sales agent with the potential customer. In that telephone conference, an interest rating is determined for the potential customer by the assigned sales agent. The interest rating is reflective of the perceived importance of the financial coaching services to the potential customer. When the interest rating exceeds a predetermined threshold interest rating, the potential customer is associated to an assigned enroller, and that assigned enroller initiates a telephone conference with the potential customer.

During the telephone conference, a readiness rating is determined for the potential customer that reflects the perceived willingness of the potential customer to purchase financial coaching services. When the readiness rating for the potential customer exceeds a predetermined readiness rating, the potential customer is enrolled as a buyer of the financial coaching services.

The buyer is oriented by telephone to the financial coaching services, and the buyer is conducted through an ordered sequence of one-on-one financial coaching sessions by way of electronic communication media. The buyer may be required to complete assignments between consecutive pairs of the financial coaching sessions. By way of electronic communication media, the buyer is supplied with financial coaching resources related to financial coaching sessions, and the interest of the buyer is evaluated in purchasing supplemental financial coaching services after the sequence of financial coaching sessions has been completed. The buyer is also then given access, by way of electronic communication media, to advanced financial conferences.

BRIEF DESCRIPTION OF THE SEVERAL VIEWS OF THE DRAWINGS

In order that the manner in which the above-recited and other advantages of the present invention are obtained will be readily understood, a more particular description of the present invention briefly described above will be rendered by reference to specific embodiments thereof that are illustrated in the appended drawings. Understanding that these drawings depict only typical embodiments of the present invention, and are not, therefore, intended to be limiting of the scope thereof, the present invention will be described and explained with additional specificity and detail through the use of the accompanying drawings in which.

DETAILED DESCRIPTION OF THE INVENTION

It will be readily understood that the elements of the disclosed embodiments of the subject invention as generally described and illustrated in FIGS. 1-7 herein could be arranged and designed in a variety of different relationships. Thus, the following more detailed description of the embodiments of the systems and methods of the present invention, as represented in FIGS. 1-7, is not intended to limit the scope of the present invention, as claimed, but is merely representative of exemplary embodiments of the present invention.

The word "exemplary" is used herein to mean "serving as an example, instance, or illustration." Any embodiment described herein as "exemplary" is not necessarily to be construed as preferred or advantageous over other embodiments.

As used herein, the world wide web is global interlinked hypertext system that uses the infrastructure of the internet to network client workstations and servers all around the world based on an established Hypertext Transport Protocol (hereinafter "HTTP"). The world wide web also incorporates hypermedia, which includes hyperlinked multimedia, such as text, audio, graphics, animations, and video. The electronic location of an element of the world wide web is identified by a Uniform Resource Locator address (hereinafter "a ULR address"). A "browser" includes any software module capable of using HTTP to read, translate, or otherwise process code residing at a ULR address on the world wide web. A "website" or "web page" includes any set of computer readable instructions residing in one or in a combination of locations that is or are capable of being accessed through the world wide web. Websites are able to display text, images, video streams, and sound, as well as URL links to other websites or applications.

The order of the steps or actions of the methods described in connection with the embodiments disclosed herein may be changed without departing from the scope of the present invention. Thus, any order depicted in FIGS. 1-7 or mentioned in the corresponding detailed description is illustrative only, and does not imply an order that is required by teachings of the present invention taken as a whole.

Figure 1:
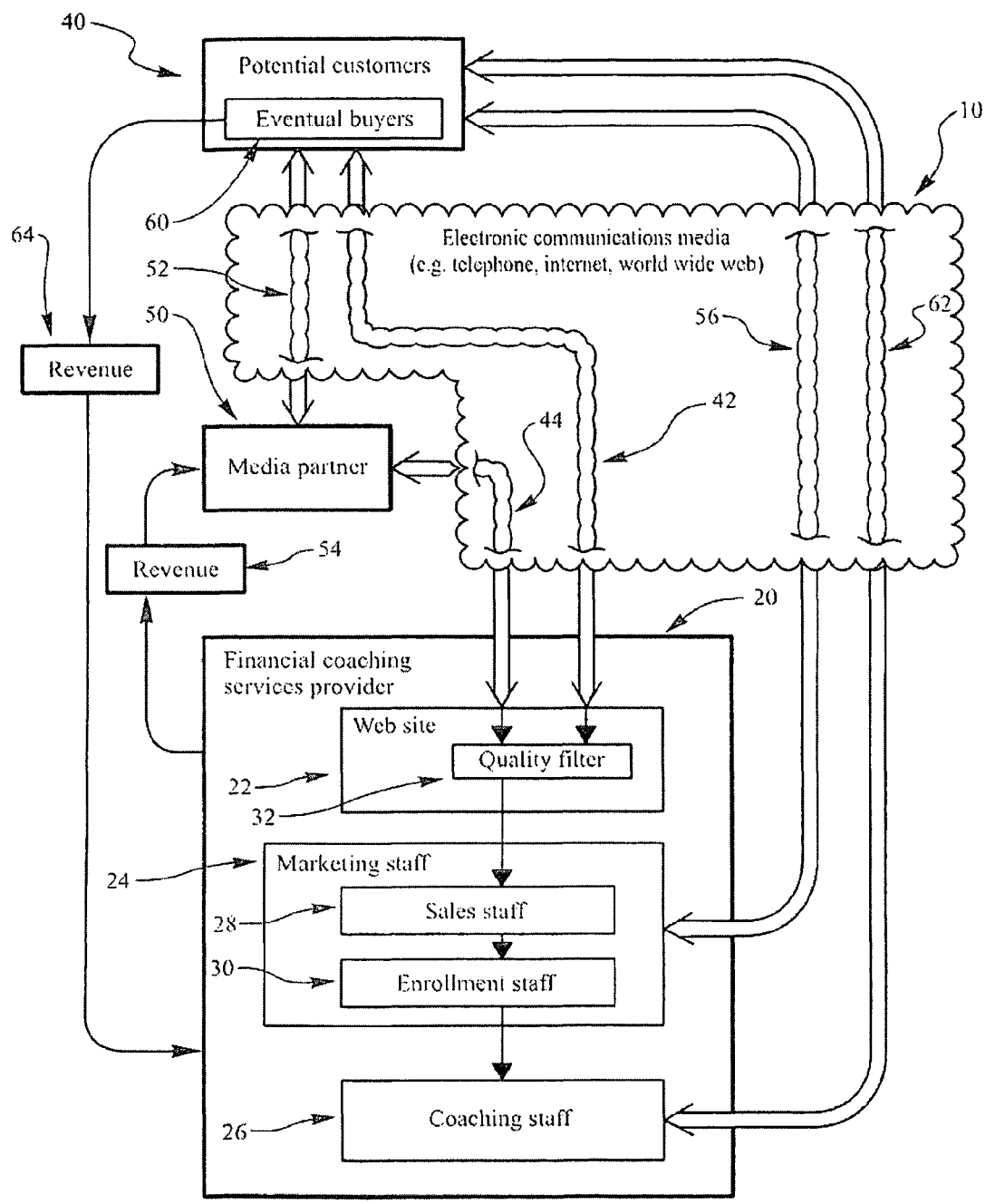
FIG. 1 is an overview block diagram of typical individuals and entities involved in marketing and distributing financial coaching services according to methods embodying teachings of the present invention.

FIG. 1 is an overview block diagram of typical individuals and entities involved in marketing and distributing financial coaching services according to methods embodying teachings of the present invention. Those individuals and entities are able to engage in give-and-take information transactions between and among each other using electronic communications media 10. As used herein, communications media 10 includes without limitation existing and future elements of the internet, the world wide web, and all modes of telephonic exchange.

As seen in FIG. 1, a financial coaching services provider 20 sponsors a website 22 pertaining to those financial coaching services. Services provider 20 organizes a marketing staff 24 specialized to sell the financial coaching services and employs a skilled coaching staff 26 that delivers the services. Marketing staff 24 encompasses a sales staff 28 and an enrollment staff 30. Among other potentially useful subdivisions, website 22 includes a quality filter 32 that is used to evaluate the possible value of business leads or potential customers 40 as eventual actual revenue-generating buyers of financial coaching services. Quality filter 32 of website 22 not only screens out from further processing by services provider 20 potential customers 40 that offer no or little chance of developing into buyers of financial coaching service, but quality filter 32 also evaluates each promising potential customer 40 in a manner that guides the subsequent processing of that promising potential customer 40 by marketing staff 24 of services provider 20.

Initial communications between potential customer 40 and services provider 20 can occur through communications media 10 in a direct contact 42 or in an indirect contact 44 that is intermediated by an electronic communications media partner 50. Media partner 50 is engaged by services provider 20 to direct to website 22 a volume of potential customers 40 that, due to the expertise of media partner 50 in securing the attention of potential customers 40, is enhanced over the volume that can be produced by the expertise and personnel of services provider 20 alone.

In such instances, the initial communications on behalf of services provider 20 with potential customers 40 is a direct contact 52 from or with media partner 50. Each potential customer 40 for which it is appropriate to do so is referred by media partner 50 to website 22 of services provider 20 by way of indirect contact 44. For this referral service, services provider 20 remits to media partner 50 revenue 54 in an amount based on the evaluation reached in quality filter 32 for potential customers 40 arriving at website 22 by indirect contact 44. Although depicted otherwise in FIG. 1, the transfer of revenue 54 to media partner 50 may be effected through the auspices of communications media 10.

Media partner 50 may be an individual or an entity that specializes in directing computer users of the internet to specific locations on the world wide web. For instance, media partner 50 may direct users to a specific web page through the use of a URL address in an e-mail message. Alternatively, media partner 50 may display a URL link or a "banner" on a web page that directs the browser of potential customers 40 to website 22 of services provider 20. In one embodiment of the present invention, media partner 50 is paid on a first so-called "cost per acquisition basis", wherein each "acquisition" represents the undertaking of a qualifying action by a user or visitor at website 22. A qualifying action may include, but is not limited to, accepting an offer presented upon first arriving at website 22 to buy goods or services, or engaging in a computer-based dialog that eventually results in a commitment by the user to purchase future financial coaching services. When a user performs a qualifying action, services provider 20 pays media partner 50 a predetermined fee.

Potential customers 40 that are forwarded by website 22 to the attention of marketing staff 24 of services provider 20 are contacted variously by sales staff 28 and enrollment staff 30 thereof directly in marketing links 56 effected through communications media 10. Potential customers 40 that are enrolled by marketing staff 24 as actual revenue-generating buyers 60 of the financial coaching services offered by services provider 20 are forwarded by marketing staff 24 for the attention of coaching staff 26. Buyers 60 receive financial coaching directly from coaching staff 26 in coaching links 62 that are also effected through communications media 10. For any financial coaching services delivered or in the future to be provided, buyers 60 remit to services provider 20 appropriate payments in the form of revenue 64. Although depicted otherwise in FIG. 1, the transfer of revenue 64 to services provider 20 may actually be effected through the auspices of communications media 10. Based on the behavior of potential customers 40 at website 22 alone, some revenue 64 may be remitted to services provider 20 by potential customers 40 that do not actually become buyers 60.

Figure 2:
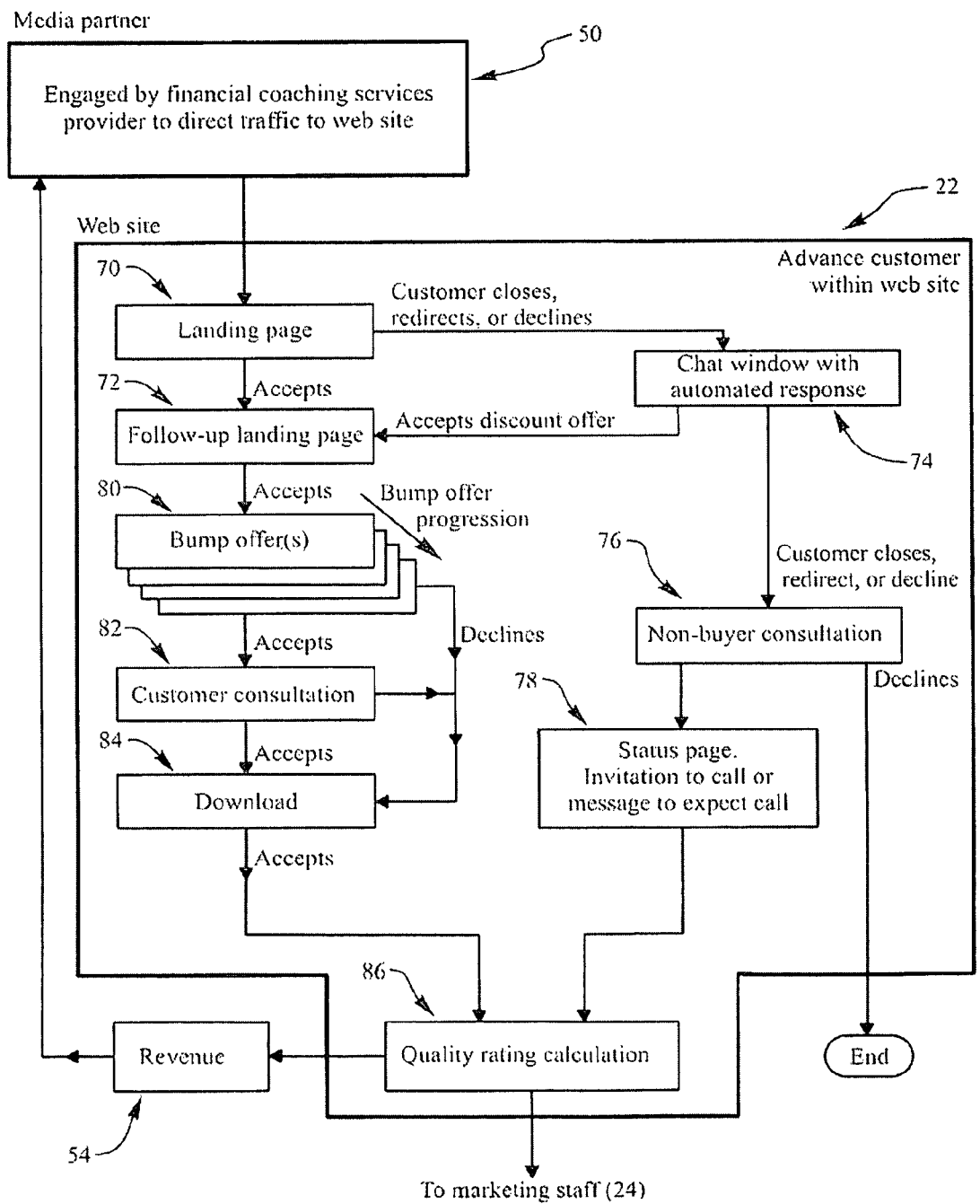
FIG. 2 is a block diagram illustrating the buyer lead generation phase of the inventive method of FIG. 1.

FIG. 2 is a block diagram illustrating the buyer lead generation phase of the inventive method of FIG. 1. For the purposes of this application, a "buyer lead" is a potential customer 40 of services provider 20. In one embodiment of the present invention, having been engaged by services provider 20, media partner 50 generates Internet traffic to a landing page 70 of website 22 of services provider 20. Landing page 70 may describe the financial coaching services offered by services provider 20, emphasizing a particular offer in doing so. The offer may be for goods or services, items such as an electronic book or services such as financial coaching. The offer may include a trial use of goods or services, and an offer may be accompanied by a guarantee from services provider 20 that the user will be paid some multiple of the offered purchase price, if the user is not satisfied with the goods or services after a predetermined time period. The user may be prompted on landing page 70 to enter initial personal information into the browser of the user for transmission to services provider 20. Such initial personal information might include the name, the e-mail address, or the phone number of the user.

If the user successfully enters this information and accepts an offer, the user may be directed to a follow-up landing page 72. At follow-up landing page 72, the user is asked to provide additional information, such as credit card particulars or a mailing address.

If the user does not successfully enter the information requested in landing page 70, attempts to close or redirect its browser, or declines the offer made in landing page 70, the user may be directed to a chat window 74. There the user is prompted to share questions or concerns about the offer presented in landing page 70. Upon submitting questions or concerns about the offer, an automated response generated by services provider 20 may appear in chat window 74. The user may then be given another opportunity inside chat window 74 to accept the offer described in landing page 70. The offer from landing page 70 may be presented again at a discount in chat window 74. If the user accepts this discounted offer, the user is directed to follow-up landing page 72, and services provider 20 pays media partner 50 as revenue 54 a fee based on a second cost per acquisition basis that is lower than the first cost per acquisition basis.

If the user attempts to close or redirect its browser, or declines the offer presented in chat window 74, the user may be directed to a non-buyer consultation page 76. At non-buyer consultation page 76, the user may be presented with a second offer for goods or services and asked to answer one or more questions relevant to the second offer. This second offer could be an invitation to participate in a pre-paid consultation with a financial coach. The questions may be multiple choice or open-ended and may apply to the financial status, the financial knowledge, and the interest of the user. If the user successfully enrolls at the non-buyer consultation page 76, the user may be directed to a status page 78. There the user may be invited to call services provider 20 on the telephone or be given a message about when to expect a telephone call or other communication from services provider 20. Upon the successful enrollment of a user at non-buyer consultation page 76, services provider 20 pays media partner 50 as revenue 54 a fee based upon a third cost per acquisition basis that is even lower than the second cost per acquisition bases.

If the user successfully enters the information requested in follow-up landing page 72, the user may be directed to a single or to a progression of bump pages 80. There the user is presented with additional so-called "bump" offers. Website 22 may include multiple consecutive bump pages 80, each giving the user a renewed chance to purchase additional goods or services priced at a flat fee, a time-based fee, or both. If the user attempts to redirect or close its browser while viewing a bump page 80, the user may be redirected by website 22 to one or more additional marketing pages that are similar in content to the presentations made in chat window 74 or in non-buyer consultation page 76.

If the user successfully fills out a bump page 80, the user becomes one of buyers 60 of services provider 20. Then, or even possibly if the user declines all bump offers, the user or buyer 60 may be directed to a buyer consultation page 82. There the user or buyer 60 is invited to participate in a second offer. The user or buyer 60 is asked to answer additional questions relevant to the second offer. The questions may be multiple choice or open-ended and may be designed to elicit additional information about the financial status, the financial knowledge, and the interests of the user or buyer 60.

If the user or buyer 60 successfully enrolls in buyer consultation page 82, that user or buyer 60 may be directed to a download page 84. There, the user or buyer 60 is given access to the goods or services purchased in the first, the second, or any of the bump offers. For instance, if an electronic book has been purchased, the electronic book is downloaded to the user or buyer 60 at download page 84. The user or buyer 60 may also be requested as at status page 78 to call services provider 20 on the telephone or be given a message about when to expect a telephone call or other communication from services provider 20.

At the end of the buyer lead generation phase of the inventive method, services provider 20 undertakes a quality rating calculation 86 to determine the economic value, both realized and potential, of each buyer lead. This determination is based on many and diverse factors and need not be shared with the buyer lead. Among the possible factors used to calculate the quality rating of a buyer lead are the number and the respective prices of offers purchased from services provider 20, as well as whether the buyer lead successfully enrolled in either buyer consultation page 82 or non-buyer consultation page 76. When multiple offers have been purchased, and a buyer lead enrolls in future financial coaching, the quality rating of the buyer lead is higher than when fewer offers are accepted or the buyer lead does not enroll in any financial coaching. Should a buyer lead enroll at either buyer consultation page 82 or non-buyer consultation page 76, the answers provided by the buyer lead in so doing may be considered in calculating the quality rating to be associated with that buyer lead.

A buyer lead at website 22 may have given strong indications of being an appropriate beneficiary of the financial coaching offered by services provider 20, but the buyer lead may not have quite completed an enrollment for those financial coaching services. These buyer leads are still considered by services provider 20 as having business potential and are forwarded for the attention of marketing staff 24 to be developed through less mechanized contacts as applicants to become revenue producing buyers 60.

Figure 3:
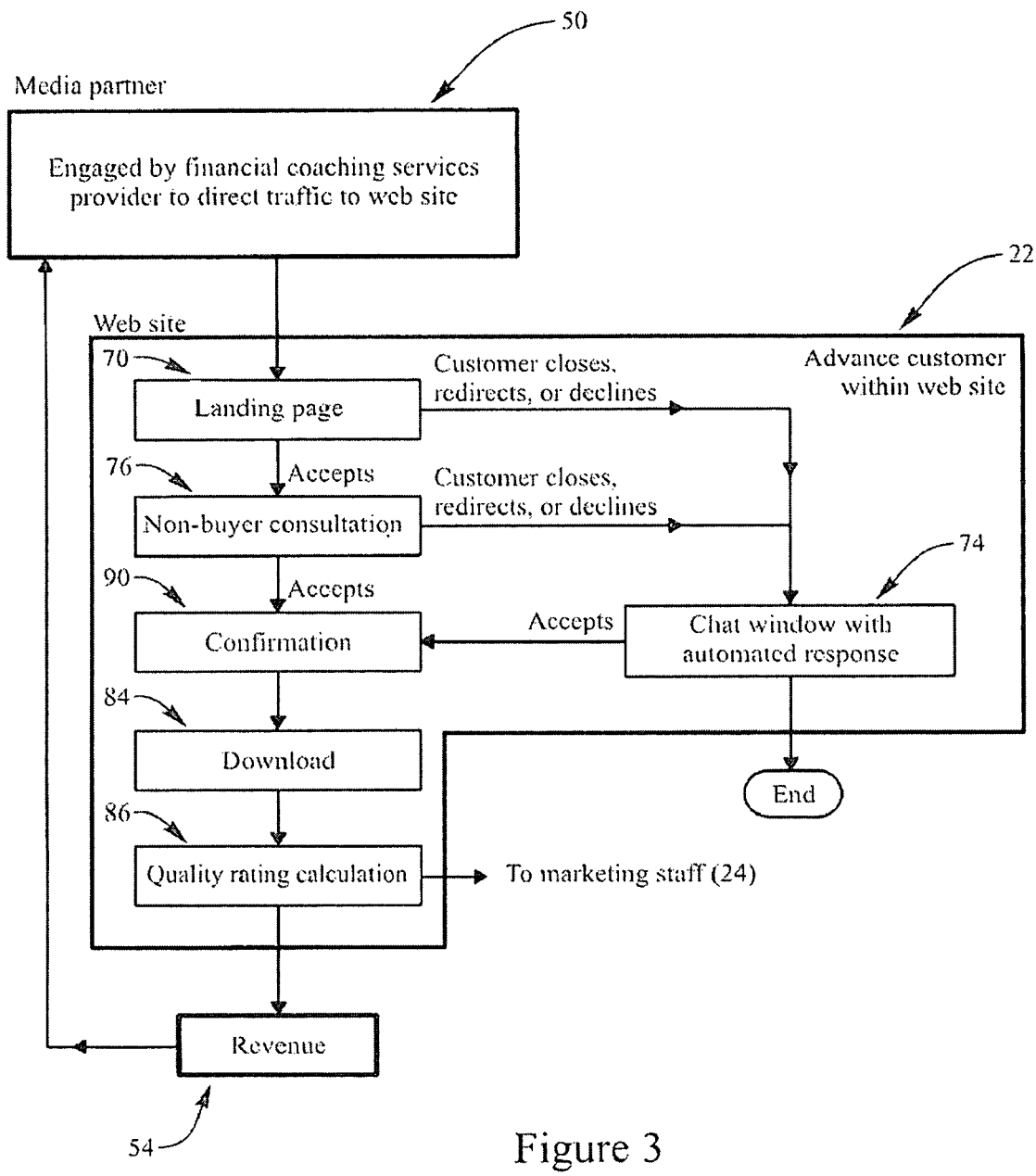
FIG. 3 is a block diagram illustrating the application lead generation phase of the inventive method of FIG. 1.

FIG. 3 is a block diagram illustrating the application lead generation phase of the inventive method of FIG. 1 that distinguishes such applicants from other buyer leads. Media partner 50 directs users to website 22 of services provider 20. In the application lead generation phase of the inventive method, revenue 54 paid to media partner 50 by services provider 20 may be less than that paid in the buyer lead generation phase shown in FIG. 2, because, for example, no credit card information is required of a potential customer 40 in the application lead generation phase of the inventive method.

The user is directed to landing page 70, where the user is prompted to provide personal information, such as a name, an e-mail address, a telephone number, and or a mailing address. Upon successfully inputting the requested personal information on landing page 70, the user is directed to non-buyer consultation page 76. There, the user may be asked to complete additional questions relevant to an offer for pre-paid financial coaching. The questions may be multiple choice or open-ended and may pertain to the financial status, the financial knowledge, and the interest of the user in improving its financial situation. Alternatively, landing page 70 and non-buyer consultation page 76 may be combined into a single page of website 22. In that case, the questions asked may be fewer and require less time and effort of a user.

In either case, if the user attempts to exit or redirect its browser or declines the offer, chat window 74 may be presented to the user. The user is prompted to share any questions or concerns about the offer described in landing page 70. Upon submitting questions or concerns about the offer, an automated response generated by marketing staff 24 of services provider 20 may appear in chat window 74. The user may then be given another opportunity inside chat window 74 to accept the offer described in landing page 70, and offer may there be represented at a discount. If the user accepts this offer, the user is directed to a confirmation page 90.

At confirmation page 90, the user may be prompted to call services provider 20 in order to participate in the program of financial coaching described in landing page 70, or the user may be given a second opportunity to purchase financial goods or services. The goods and services may be priced at a flat fee, a time-based fee, or both. As appropriate, the user is directed to download page 84, where the user receives any goods purchased. Based on the number of offers accepted and the answers provided to questions at non-buyer consultation page 76, quality rating calculation 86 is conducted and a quality rating is determined for and associated with the user.

Revenue 54 is paid to media partner 50 by services provider 20 in accordance with a predetermined referral fee calibrated to the quality rating determined for the potential customer 40.

The quality rating determined in quality rating calculation 86 for potential customer 40 is compared to a predetermined quality rating. When the quality rating associated with potential customer 40 exceeds the predetermined threshold quality rating, the identity and related information collected about potential customer 40 is forwarded from website 22 of services provider 20 to the attention of marketing staff 24 thereof.

Figure 4:
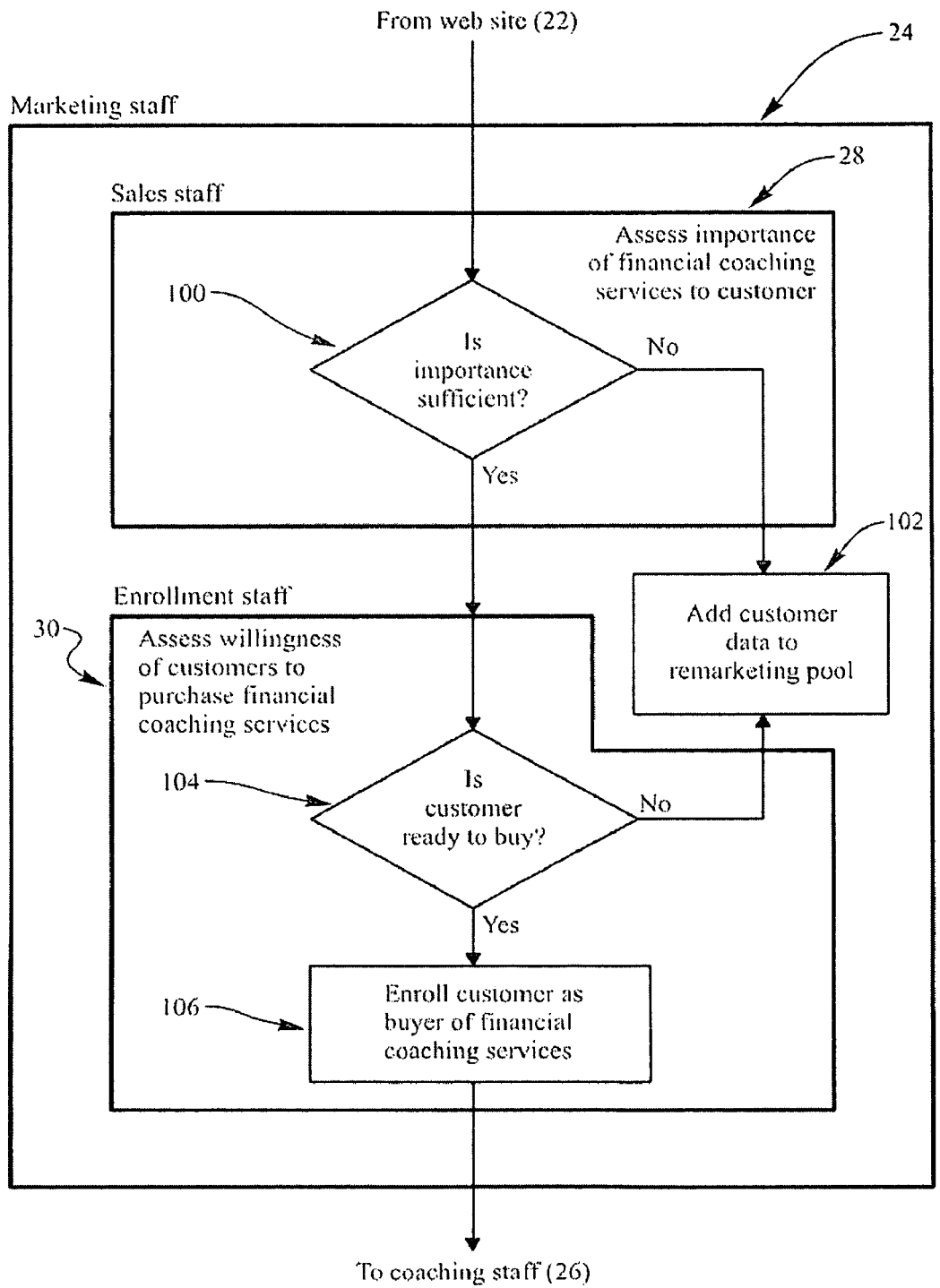
FIG. 4 is a block diagram of the internal interactions among portions of the marketing staff of a financial coaching services provider that employs the inventive method of FIG. 1.

FIG. 4 is a block diagram of the interactions within marketing staff 24 of a service provider, such as services provider 20, which employs the method of FIG. 1.

Potential customer 40 initially receives the attention of the sales staff 28 portion of marketing staff 24. Sales staff 28 assesses the importance to potential customers 40 of the financial coaching services offered by services provider 20. As will be illustrated in subsequent of the drawings, this involves first associating potential customer 40 to an assigned sales agent on the basis of the quality rating determined earlier for potential customer 40. Then, the assigned sales agent initiates a telephone conference with potential customer 40. Finally, an interest rating is determined by the assigned sales agent for potential customer 40 based on the behavior of potential customer 40 during that telephone conference.

The interest rating for potential customer 40 is intended to reflect the perceived importance to potential customer 40 of the financial coaching services available from services provider 20. As suggested by decision diamond 100 in FIG. 4, when the interest rating determined for potential customer 40 exceeds a predetermined threshold interest rating, the identity and related information collected about potential customer 40 is forwarded from sales staff 28 to the attention of enrollment staff 30. On the other hand, if the interest rating determined for potential customer 40 does not exceed the predetermined threshold interest rating, the identity and related information collected about potential customer 40 is added to a remarketing pool 102 for possible subsequent renewed marketing strategizing by members of marketing staff 24.

Enrollment staff 30 assesses the willingness of potential customer 40 to actually purchase the financial coaching services offered by services provider 20. As will be illustrated in subsequent of the drawings, this involves first associating potential customer 40 to an assigned enroller on the basis of the interest rating determined for potential customer 40 by sales staff 28. Then, the assigned enroller initiates a telephone conference with potential customer 40. Finally, a readiness rating is determined by the assigned enroller for potential customer 40 based on the behavior of potential customer 40 during that telephone conference. The readiness rating for potential customer 40 is intended to reflect the willingness of potential customer 40 to purchase the financial coaching services offered by services provider 20.

As suggested by decision diamond 104 in FIG. 4, subsequent measures undertaken relative to potential customer 40 are based on amount of the readiness rating determined for potential customer 40 by the assigned enroller. When the readiness rating associated with potential customer 40 exceeds a predetermined threshold readiness rating, then as indicated in instructions rectangle 106, the assigned enroller or another member of enrollment staff 30 promptly enrolls potential customer 40 as a buyer 60 of the financial coaching services of services provider 20. Then the identity and related information collected about buyer 60 is forwarded from enrollment staff 30 to coaching staff 26 of services provider 20. If on the other hand, the readiness rating associated with potential customer 40 does not exceed the predetermined threshold readiness rating, the identity and related information collected about potential customer 40 is added to remarketing pool 102 for possible subsequent renewed marketing strategizing by members of marketing staff 24.

Figure 5:
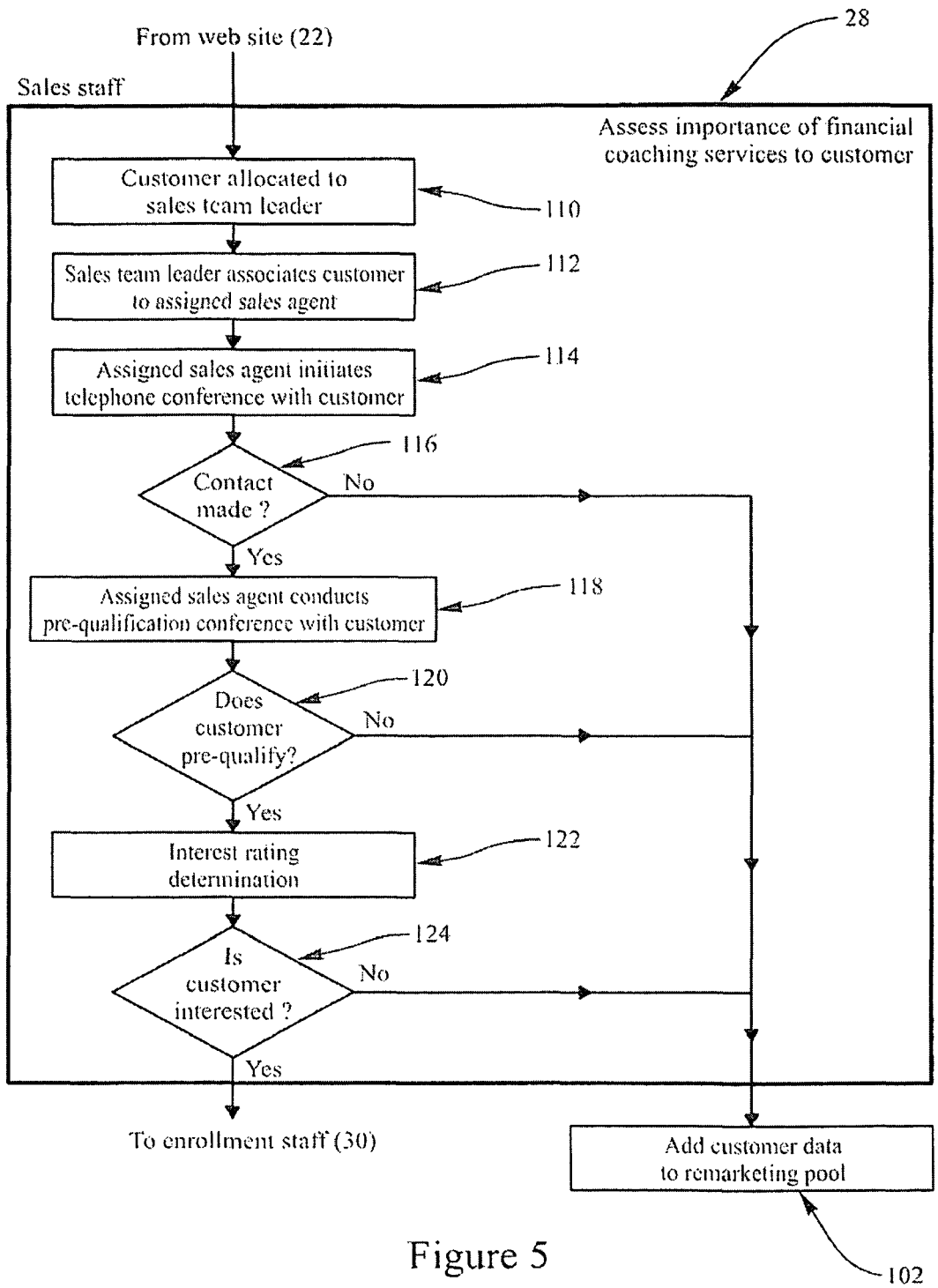
FIG. 5 is a block diagram illustrating the portion of the lead allocation and financial services sales phase of the inventive method of FIG. 1 that is performed by a sales staff.

FIG. 5 is a block diagram illustrating the portion of the lead allocation and financial services sales phase of the inventive method of FIG. 1 that is performed by sales staff 28. It is the primary task of sales staff 28 to assess the importance to the buyer lead of the financial coaching serves of services provider 20. Sales staff 28 is organized into a plurality of sales teams that are each collectively trained and qualified to consult and sell products and services in particular to buyer leads of a specific predetermined range of quality ratings as determined, either in the buyer lead generation process of FIG. 2, or in the application lead generation process of FIG. 3. Each sales team is made up of from six to fifteen members. Some or all members of a given sales team may be trained and qualified to consult and sell products and services to buyer leads in a plurality of ranges of quality ratings. As indicated in instructions rectangle 110, each buyer lead is allocated one of the several sales teams of sales staff 28 and correspondingly to the team leader of that sales team. Services provider 20 may maintain a database of sales personnel from which sales teams are organized and by which each buyer lead is assigned to a given sales team. As indicated in instructions rectangle 112, the team leader of a sales team to which a buyer lead has been allocated associates the buyer lead to a sales agent in the team based on a variety of criteria, such as the expertise and the existing workload of the sales agents of that team.

As indicated in instructions rectangle 114, the assigned sales agent attempts to contact the buyer lead over the telephone. This may be done a predetermined number of times or for a predetermined period of time. If the buyer lead is not able to be contacted by the assigned sales agent within the constraints specified by services provider 20, then as indicated in decision diamond 116, the identity and related information collected about the buyer lead is added to remarketing pool 102. Services provider 20 may continue to attempt contact any buyer lead listed in remarketing pool 102 on the telephone, by direct mailings, or using any other available communication medium. On the other hand, if the buyer lead is successfully contacted by the assigned sales agent, then as indicated in instructions rectangle 118, that assigned sales agent attempts to pre-qualify the buyer lead to facilitate further marketing efforts by services provider 20.

During pre-qualification, the assigned sales agent questions the buyer lead regarding various qualifying criteria. The qualifying criteria may include the motivation of the buyer lead to change its financial situation, the identity of the financial decision maker in the household of the buyer lead, the perceived degree of agreement by the members with that financial decision maker, and the existing financial ability of the buyer lead to purchase goods or services from services provide 20. Based on the responses to such questions, the assigned sales agent determines whether the buyer lead is a good candidate for further marketing efforts, as shown at decision diamond 120. If not, then the identity and related information collected about the buyer lead is added to remarketing pool 102. On the other hand, if the assigned sales agent determines that the buyer lead warrants further marketing efforts, a further consultation completion is scheduled with the buyer lead.

In preparation for a consultation completion, the buyer lead may be required to gather its own personal financial data. The consultation completion should occur promptly, preferably within no later than 48 hours from the pre-qualification conference. Then, as indicated in instructions rectangle 122, an effort ensues by the assigned sales agent to determine for the buyer lead a rating of its interest in purchasing the financial coaching services offered by services provider 20.

The assigned sales agent may begin with an introduction. This involves an examination of the existing financial situation and the financial goals of the buyer lead. The financial data of the buyer lead may be analyzed, and the assigned sales agent may ask questions of the buyer lead regarding its finances. The assigned sales agent may then make suggestions to the buyer lead regarding its finances and ask whether the buyer lead would like the help of a financial coach, as indicated at decision diamond 124. If the buyer lead answers that no such help is desired, the assigned sales agent adds the identity and related information collected about the buyer lead to remarketing pool 102. If the buyer lead is positive about retaining the help of a financial coach, the assigned sales agent provides a brief description of the program for financial coaching and forwards the identity and related information collected about the buyer lead to the attention of enrollment staff 30.

In doing so, the assigned sales agent may even schedule a time for a director of enrollment staff 30 to call the buyer lead by telephone. An enrollment director is a skilled employee of services provider 20 whose experience is particularly suited to actually enrolling buyer leads in the financial coaching offered by services provider 20. For the purposes of this application, a former buyer lead becomes a "client" or a customer, once that buyer lead has been enrolled in the financial coaching provided by services provider 20.

Figure 6:
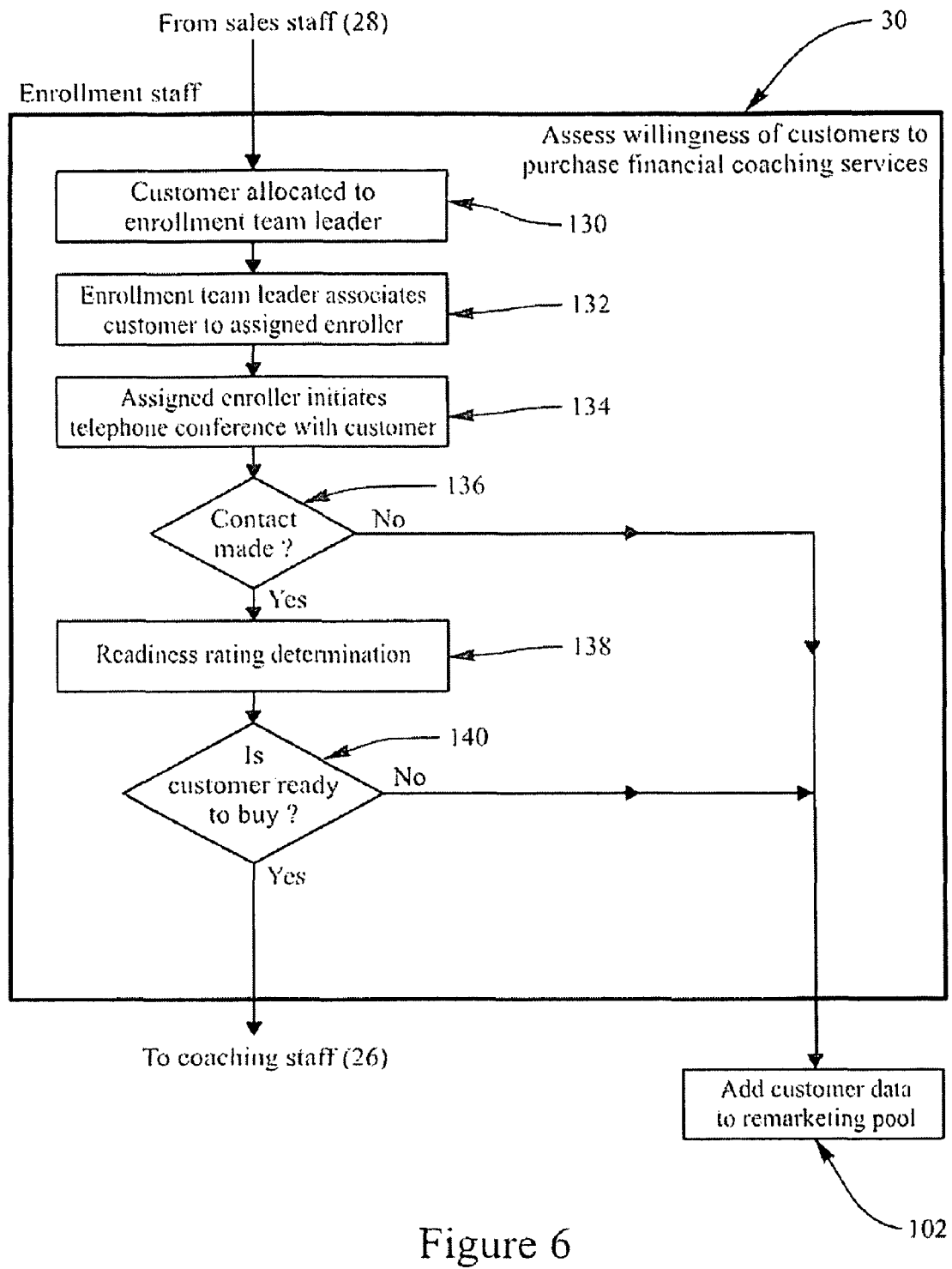
FIG. 6 is a block diagram illustrating the portion of the lead allocation and financial services sales phase of the inventive method of FIG. 1 that is performed by an enrollment staff.

FIG. 6 is a block diagram illustrating the portion of the lead allocation and financial services sales phase of the inventive method of FIG. 1 that is performed by enrollment staff 30. It is the primary task of enrollment staff 30 to assess the willingness of the buyer lead to purchase the financial coaching serves of services provider 20. Enrollment staff 30 is organized into a plurality of enrollment teams that are each collectively trained and qualified to sell products and services in particular to buyer leads of a specific predetermined range of interest ratings as determined in the lead allocation and financial services sales phase of the inventive method illustrated in FIG. 5. Each enrollment team is made up of from six to fifteen members. Some or all members of a given enrollment team may be trained and qualified to sell products and services to buyer leads in a plurality of ranges of interest ratings. As indicated in instructions rectangle 130, each buyer lead is allocated to one of the several enrollment teams of enrollment staff 30 and correspondingly to the team leader of that enrollment team. Services provider 20 may maintain a database of enrollment personnel from which enrollment teams are organized and by which each buyer lead is assigned to a given enrollment team. As indicated in instructions rectangle 132, the team leader of an enrollment team to which a buyer lead has been allocated associates the buyer lead to an enroller in the team based on a variety of criteria, such as the expertise and the existing workload of the enrollers of that team.

As indicated in instructions rectangle 134, the assigned enroller attempts to contact the buyer lead over the telephone. This may be done a predetermined number of times or for a predetermined period of time. If the buyer lead is not able to be contacted by the assigned enroller within the constraints specified by services provider 20, then as indicated in decision diamond 136, the identity and related information collected about the buyer lead is added to remarketing pool 102. Services provider 20 may continue to attempt contact any buyer lead listed in remarketing pool 102 on the telephone, by direct mailings, or using any other available communication medium. On the other hand, if the buyer lead is successfully contacted by the assigned enroller, then as indicated in instructions rectangle 138, then as indicated in instructions rectangle 138, an effort ensues by the assigned enroller to determine for the buyer lead a rating of its readiness to purchase the financial coaching services offered by services provider 20.

The assigned enroller may reexamine the existing financial situation and the financial goals of the buyer lead and make suggestions to the buyer lead regarding its finances. Ultimately, the assigned enroller asks whether the buyer lead would like the help of a financial coach. Decision diamond 140 represents the buyer's response. If the buyer lead answers that no such help is desired, the assigned enroller adds the identity and related information collected about the buyer lead to remarketing pool 102. If the buyer lead is positive about retaining the help of a financial coach, the assigned enroller provides a brief description of the program for financial coaching and forwards the identity and related information collected about the buyer lead to the attention of coaching staff 26.

In doing so, the assigned sales agent may schedule a time for a member of coaching staff 26 to call the buyer lead by telephone. Members of coaching staff 26 are skilled employees of services provider 20 having training and experience that are particularly suited to delivering the one-on-one financial coaching offered by services provider 20.

Figure 7:
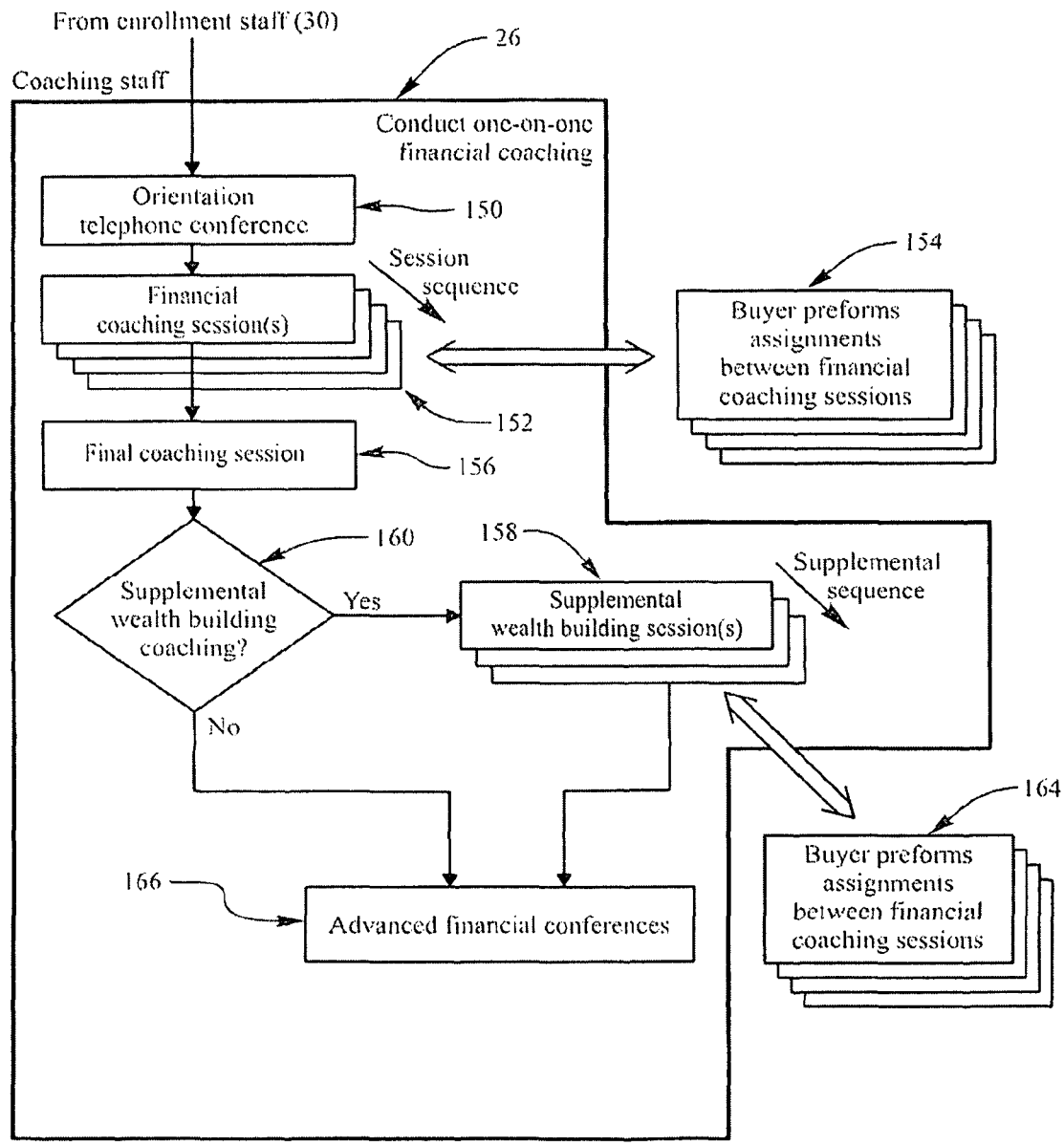
FIG. 7 is a block diagram illustrating the one-on-one financial coaching phase of the inventive method of FIG. 1.

FIG. 7 is a block diagram illustrating the one-on-one financial coaching phase of the inventive method of FIG. 1. Once a client is enrolled by enrollment staff 30 in a financial coaching program offered by services provider 20, as shown in instructions rectangle 150, an orientation specialist from coaching staff 26 calls the client on the telephone and conducts an orientation conference. This may include walking the client through a program overview and giving the client access to online resources, such as audio lectures, video lectures, or an electronic library of print resources. The orientation conference should optimally take place within 24 hours of the enrollment of the client.

After the orientation call, a financial coach calls the client and, as indicated in instructions rectangle 152, the financial coach conducts financial coaching sessions with the client. A financial coach may be a person employed by or contracting with services provider 20 to examine a client's financial situation and to help clients to achieve the understood financial goals. The financial coach may conduct one or more financial coaching sessions with a client. After each coaching session, the client may be given assignments to complete in preparation for the next coaching session. These are illustrated schematically in FIG. 7 by buyer activity rectangles 154. Assignments may include the participation in a weekly group coaching session, the participation in monthly conference calls, the completion of interactive electronic coursework through the internet, or various reading assignments from a library. The library may be an electronic resource maintained by services provider 20 to which the client is afforded access during the enrollment term of the client. Such an electronic resource may include an electronic library, an archive of past recorded financial coaching sessions, and video conferencing and telephone support resources. The assignments and resources called for by buyer activity rectangles 154 may utilize telephone, interactive websites, e-mail, or any other electronic communication medium. Additionally, software allowing services provider 20 access to or temporary control over the computer of the client may be used to help the client receive those electronic resources. Throughout the coaching process, services provider 20 maintains documentation about the status and financial development of the client, including documentation of the willingness of the client to complete assignments successfully and the progress of the client toward financial goals.

After the financial coaching sessions suggested by instructions rectangle 152, the client participates in a final coaching session as called for in instructions rectangle 156. In the final coaching session the financial coach reviews the resources available to the client, and motivates and encourages the client toward further progress in financial matters. The final coaching session may enable the financial coach to collect a success story about the client for use in the marketing publicity of services provider 20. Also, during the final coaching session, the financial coach may explain to the client that, as suggested in instructions rectangles 158, supplemental wealth building sessions are available for purchase by the client. Pursuant to decision diamond 160, should the client be interested in supplemental wealth building sessions, an appointment is scheduled to begin them. There may be one or a plurality of these supplemental wealth building sessions, which may focus on areas of financial investing of interest to financial sophisticates, such as e-commerce, real estate, online trading, or small business investing. After each supplemental wealth building session, the client may be given assignments to complete in preparation for the next supplemental wealth building session. These are illustrated schematically in FIG. 7 by buyer activity rectangles 164.

Lastly, as indicated in instructions rectangle 166 the client may be invited to participate in monthly graduate conference calls. These monthly graduate conference calls may enable services provider 20 to gather an updated progress report from the client and to motivate and encourage efforts to continue toward the financial goals of the client. For this reason, and as suggested by decision diamond 160, graduate conference calls may be offered to a client that is nonetheless uninterested in participating in supplemental wealth building sessions.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. A method for marketing and delivering financial coaching services, the method comprising the steps of:
   (a) sponsoring a website pertaining to the financial coaching services;
   (b) engaging an electronic communications media partner to direct potential customers to said website for the financial coaching services;
   (c) calculating a quality rating for a potential customer based on the behavior of the potential customer at said website, said quality rating reflecting the business opportunity value of the potential customer at said web site;
   (d) associating the potential customer to an assigned sales agent when said quality rating for the potential customer exceeds a predetermined threshold quality rating;
   (e) initiating a telephone conference by said assigned sales agent with the potential customer;
   (f) determining an interest rating for the potential customer based on the behavior of the potential customer during said telephone conference initiated by said assigned sales agent, said interest rating reflecting the importance of the financial coaching services to the potential customer;
   (g) associating the potential customer to an assigned enroller when said interest rating determined for the potential customer exceeds a predetermined threshold interest rating;
   (h) initiating a telephone conference by said assigned enroller with the potential customer;
   (i) determining a readiness rating for the potential customer based on the behavior of the potential customer during said telephone conference initiated by said assigned enroller, said readiness rating reflecting the willingness of the potential customer to purchase the financial coaching services;
   (j) enrolling the potential customer as a buyer of the financial coaching services when said readiness rating for the potential customer exceeds a predetermined readiness rating;
   (k) orienting the buyer by telephone to the financial coaching services;
   (l) by way of electronic communication media, conducting the buyer through an ordered sequence of one-on-one financial coaching sessions;
   (m) requiring completion by the buyer of an assignment between consecutive pairs of said financial coaching sessions;
   (n) supplying the buyer with financial coaching resources related to said financial coaching sessions by way of electronic communication media; and
   (o) evaluating the interest of the buyer in purchasing supplemental financial coaching services after completing said step of conducting the buyer though said sequence of financial coaching sessions.

2. A method as recited in claim 1, further comprising the step of affording the buyer access to an advanced financial conference by way of electronic communication media after completing said step of conducting the buyer though said sequence of financial coaching sessions.

3. A method as recited in claim 1, further comprising the steps of:
   (a) obtaining initial data from a potential customer at a landing page of said website;
   (b) forwarding the potential customer to a follow-up location within said website based on said initial data, said follow-up location being chosen from among the group of follow-up locations including a supplemental landing page, a chat window, a bump offer screen, and a customer consultation page; and
   (c) obtaining further data from the potential customer at said follow-up location.

* * * * *